Aug. 20, 1935.    B. COBB    2,012,184
FABRIC AND METHOD OF MAKING SAME
Filed July 10, 1934    5 Sheets-Sheet 1

Inventor
Boughton Cobb
By Thomas A. Jenckes
Attorney

Aug. 20, 1935.                 B. COBB                  2,012,184
                FABRIC AND METHOD OF MAKING SAME
                    Filed July 10, 1934      5 Sheets-Sheet 2
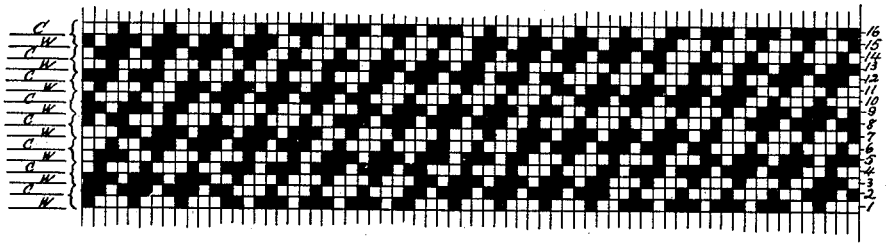
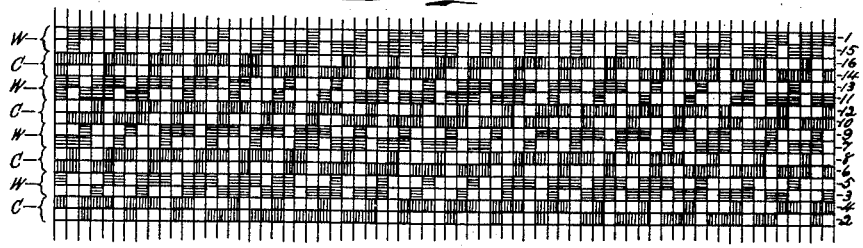
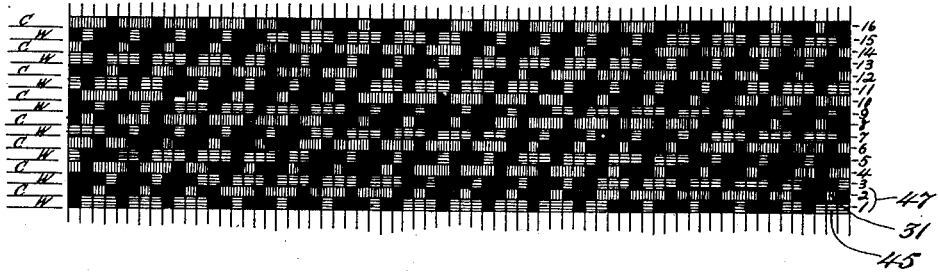
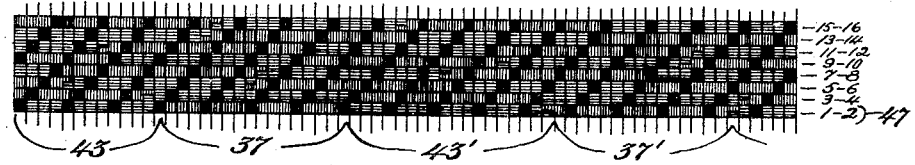
Inventor
Boughton Cobb
By Thomas A. Jenckes
Attorney Aug. 20, 1935.   B. COBB   2,012,184
FABRIC AND METHOD OF MAKING SAME
Filed July 10, 1934   5 Sheets-Sheet 3
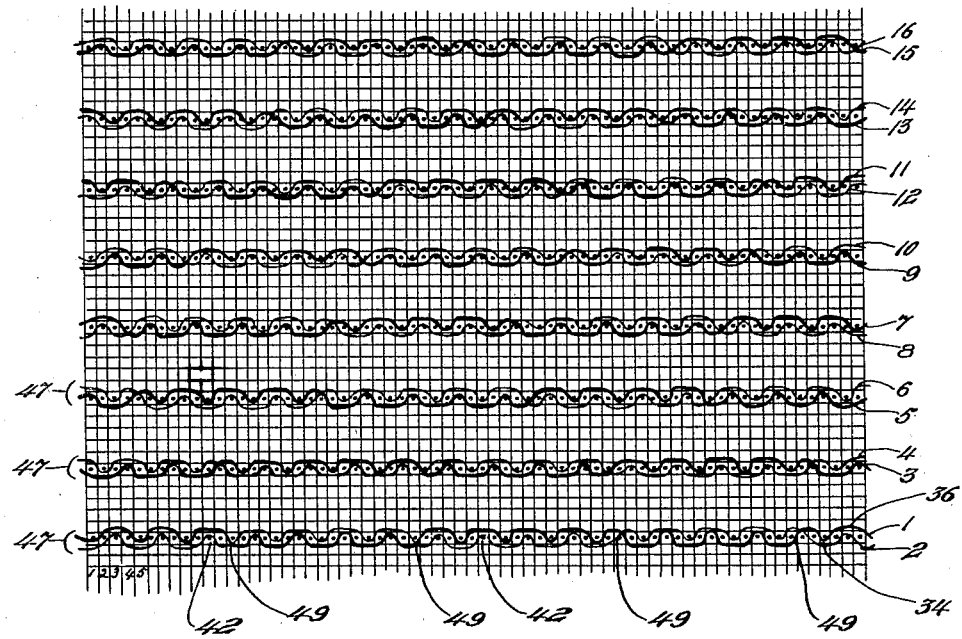
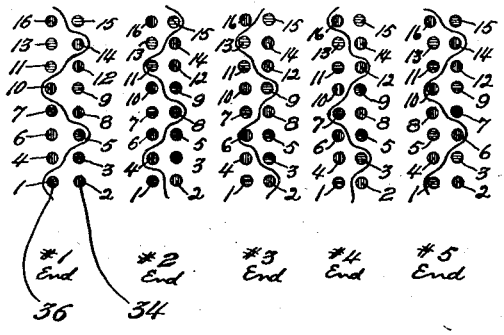
Inventor
Boughton Cobb
By Thomas A. Jenckes
Attorney Aug. 20, 1935. B. COBB 2,012,184
FABRIC AND METHOD OF MAKING SAME
Filed July 10, 1934 5 Sheets-Sheet 4
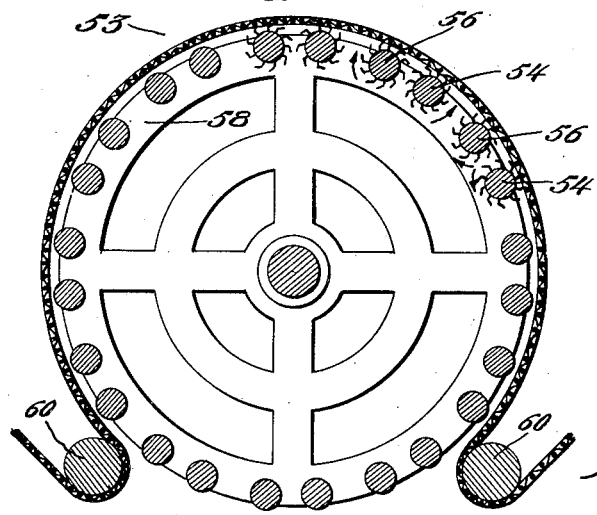
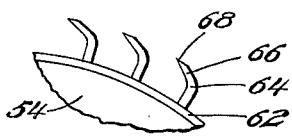
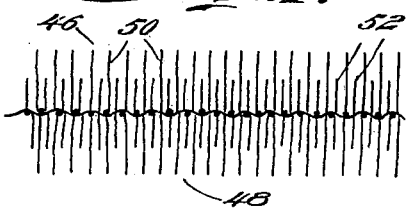
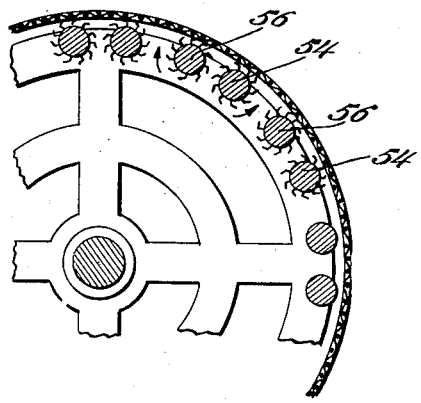
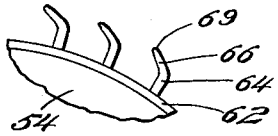
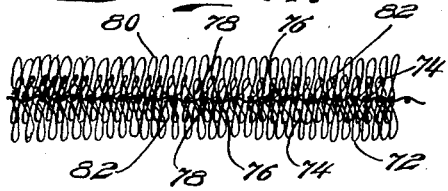
Inventor
Boughton Cobb
By Thomas A. Jenckes
Attorney Aug. 20, 1935. B. COBB 2,012,184
FABRIC AND METHOD OF MAKING SAME
Filed July 10, 1934  5 Sheets-Sheet 5
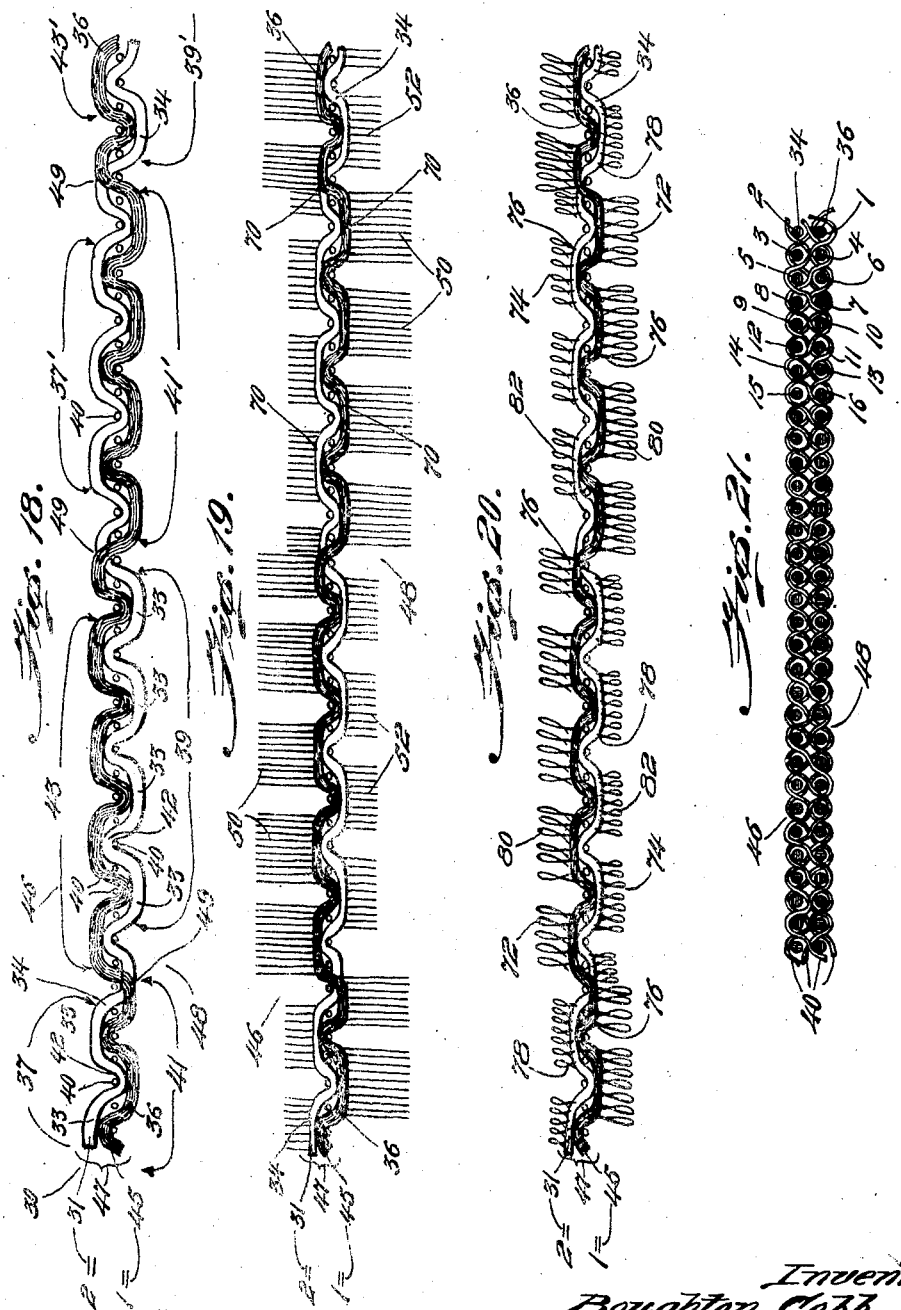
Inventor
Boughton Cobb
By Thomas A. Jenckes
Attorney Patented Aug. 20, 1935

2,012,184

UNITED STATES PATENT OFFICE 2,012,184

FABRIC AND METHOD OF MAKING SAME

Boughton Cobb, Hewlett, N. Y., assignor to The Esmond Mills, New York, N. Y., a corporation of Massachusetts Application July 10, 1934, Serial No. 734,497

12 Claims. (Cl. 139—391)

My invention relates to improvements in napped fabrics and the method of their manufacture.

While my invention is particularly adapted for use with any type of a napped fabric, it is specifically adapted for use in the manufacture of blankets where a light, compact and warm structure is desired.

In the preferred embodiment of my invention I construct my improved napped fabric with a warp and alternate filling threads containing long fibred yarn and short fibred yarn respectively, specifically wool and cotton. By doing this I am enabled to combine both the advantages of wool and cotton in a blanket structure. Warmth tests have proven that one cotton blanket plus one wool blanket are warmer than either two cotton blankets, or two wool blankets. This is probably due to the following advantages of cotton and wool. The advantages of cotton in the blanket are (1) it is of finer fibres, consequently blends together more tightly affording better insulation and (2) it is not as shrinkable as wool. These advantages are more pronounced if cotton of the species Gossypium arboreum be employed, which is namely, cotton chiefly grown in Asia or the Far East and which grows on much higher bushes than the American cotton. This cotton is short staple, ⅝" in average length, is curlier, has more serrations in the fibre and is even more similar to wool than to the cotton species Gossypium herbaceum, our usual lowland American cotton which has hitherto been employed to be mixed either alone or with wool in the manufacture of blankets. This type of cotton therefore affords even better insulation than cotton Gossypium herbaceum. The advantages of wool are; (1) durability, and (2) a more serrated fibre which holds in air cells better than cotton if enough wool is put in to construct a fabric which is closely enough woven to be an insulator. In order to do this with wool a greater quantity of wool is necessary than cotton due to the fact that wool is a coarser and more springy fibre. In other words, a two-pound cotton blanket is warmer than a two-pound wool blanket, but a four-pound wool blanket is warmer than a four-pound cotton blanket because enough wool has been put in to knit the fibres closely enough together to make good insulation. Employing my improved construction, however, the cotton fibres are arranged so closely to each other that when napped they form a compact lower insulating covering extending substantially over the body of the napped fabric and the woolen fibres are arranged so closely to each other that they will form a substantially complete or compact outer covering extending substantially over the entire body of the napped fabric having all the advantages of wool and using the outer woolen layer as a supplemental insulator and providing a more durable outer covering. By weaving first alternate threads of wool and then of cotton and binding the fabric closely together it is obvious that I am enabled to provide a fabric having the advantages of a cotton insulating covering and an outer wool insulating covering in a much better manner than if the wool and cotton were mixed together in all the filling threads. In attempting to nap threads formed from a blend of wool and cotton, it is obvious that the longer wool fibres will tend to prevent the cotton from forming a true nap.

An object of this feature of my invention therefore is to provide a mixed cotton and wool blanket which will be warmer and which may be produced at a much less cost than an all wool blanket and less cost than a blanket of equivalent percentage of cotton and wool made by mixing the wool and cotton in the yarns due to the increased cost of blending and spinning cotton and wool together in one thread. To summarize these features of my invention therefore, a napped fabric is provided which is cheaper, due to the relatively less cost of cotton, and which per unit weight, particularly in light weights is considerably warmer than where the cotton and wool are mixed in the individual threads. It affords the advantages of a cotton blanket in that it is less shrinkable than wool. It is warmer in that there is enough wool in it to provide the warmth of wool and enough cotton in it to provide the insulating qualities of finer fibres afforded by cotton. It is more durable than a mixed cotton or wool blanket constructed of mixed cotton and wool threads due to the fact that the wool fibres' springiness is not as directly affected in the yarn by the softer cotton fibres of adjacent cotton yarn or in yarn in which the fibres are mixed.

A further feature of my invention is to imitate the covering which nature gives to animals. The animal is normally provided with a relatively long fur for both winter and summer. In winter, fur bearing animals grow a short under nap of fur called "pelage" and this supplemental lower covering forms a compact insulation over the body and adds greatly to the warmth of the permanent long fur. By providing the long fur and the short fur, each over the entire body of the blanket or napped fabric, the applicant is able to imitate nature and to provide a blanket much warmer in unit weight than any hitherto produced. While I preferably employ wool fibres to form the relatively long outer coat and cotton fibres particularly cotton of the species *Gossypium arboreum* to form the relatively short inner coat or pelage, it is obvious that other types of relatively long or short fibres may be employed and that they may be arranged in these threads in any suitable or desired manner to produce the two types of coverings just referred to. In order that my improved fabric may be compact and may be provided with a short compact covering and a longer outer covering I preferably construct it in the improved manner about to be described. While threads composed of mixtures of long and short fibres or composed of long fibres alone and short fibres alone may be woven in any manner to provide a compact fabric having a surface which may be readily napped, in my preferred embodiment, however the threads may be individually constructed, I preferably weave them as follows:

I preferably weave a fabric by throwing the first of a pair of filling threads over and under the warp threads, said thread alternately floating over a plurality of warp threads and tying in under a less number for a run of a plurality of floats during a portion of its travel, then floating under a substantially equal plurality of warp threads and tying in over a less number for a substantially equal plurality of floats for the next run of its travel and so successively running alternately over and under substantially equal pluralities of floats and respectively tying in under and over a lesser number of warp threads for the balance of its travel, complementally reversely throwing the other filling thread of said pair, beating up the threads so that the float portion of each thread will substantially overlap and conceal points of tie-in of said other thread of said pair on the respective face and reverse of the fabric, successively throwing and beating up similar pairs of threads preferably up to a jacquard pattern with the respective points of over and under run reversal and if desired also points of tie-in varying in successive pairs up to the end of said pattern, providing a compact substantially even heavy face and reverse on the fabric presenting substantially equal amounts of the respective float portions of each thread of each pair thereon and I preferably employ a light warp so that the warp threads of whatever nature employed will be substantially concealed in between the filling threads in practice. I preferably vary the points of run reversal so that adjacent pairs of filling threads will have their runs irregularly staggered. In my preferred construction, I preferably employ a jacquard or dobby and repeat the pattern every sixteen pairs varying the points of run reversal and if desired also points of tie-in up to the sixteenth double throw hitherto described, although it is obvious that the pattern may be varied up to any number of picks preferably of double throw. In my preferred embodiment I employ alternate cotton and woolen threads in the filling, two cotton threads making up the pair, or two woolen threads, or preferably one cotton and one wool, or other equally long and short fibres. While I preferably weave the threads in pairs so as to provide an exactly complemental face and reverse on the fabric, it is obvious that substantially the same result may be achieved if the back throw of each pick is not the exact complement of the previous throw to provide a complemental pair.

In the preferred embodiment of my invention, to provide a float construction for napping I preferably throw the first of a pair of filling threads over and under said warp threads to form alternate substantially equal runs of face and reverse twill in said thread across said fabric, throw the other filling thread of said pair preferably of a different species reversely complementally across said fabric to form complemental alternate substantially equal runs of reverse and face twill across said fabric and beat up said threads so that the float portions of each thread will substantially overlap and conceal points of tie-in of said other thread on the respective face and reverse of said fabric, successively throw and beat up pairs of threads to form alternate complemental runs of face and reverse twill on said fabric across said warp threads up to a jacquard pattern with the respective points of face and reverse twill reversal and preferably also points of tie-in, varying in successive pairs up to the end of said pattern to provide a substantially equally heavy face and reverse on said fabric. Where threads of different species are provided in each pair, or in adjacent pairs it is obvious that I have provided a very compact weaving construction of sufficient weight for a blanket fabric, and in which runs of each individual thread appear for alternate respective distances respectively on the face and reverse of the fabric and the complemental thread of its pair fills up the gaps on the respective face and reverse of the fabric so as to provide a face and reverse consisting essentially of float threads which may be readily napped and preferably runs of pluralities of floats, which may be more readily napped and a blanket which has a double thickness of two filling threads in which the warp threads are substantially concealed and which for the purpose of making a pelage structure about to be described, presents substantially equal amounts of float threads of different species adjacent longitudinally and laterally to each other across the fabric and if the threads are pre-dyed or later piece dyed, a rather pretty fancy pattern in which the cross dye effect described in my copending application S. N. 720,261 filed April 12, 1934 may be produced.

I then take this improved fabric and put it through a special napping process. Namely I cut or raise both the long and short fibres of the respective threads preferably by a succession of rotating sharp-pointed members for a substantial distance through the floats of said threads, and I then, a feature not possible in single action or gig napping, tuck in the ends of said cut or raised fibres into the respective threads by subjecting them to the action of adjacently disposed opposite rotating rolls each containing oppositely disposed blunt pointed members to tuck or loop the ends of the long or short fibres into the body of the fabric whether it be the respective threads or the adjacent threads to form a completely tucked in outer covering and a completely tucked in inner covering extending substantially entirely over the face and reverse of said napped fabric. While I preferably provide a fabric of a construction which may be napped on each side, it is obvious that I may provide a fabric having a suitable napping structure of this description on one side only and nap it in the manner described on that side only. It is apparent therefore that I have provided a novel method of manufacturing including both weaving and napping compact fabrics of this description to provide a tucked in outer covering and a tucked in inner covering extending substantially over the entire face and reverse of the fabric.

These and such other objects of my invention as may hereinafter appear will be best understood from a description of the accompanying drawings which illustrate various embodiments of my improved fabric both napped and unnapped, and various stages in the method of its manufacture.

In the drawings, Fig. 1 is a plan view of a fabric constructed specifically in accordance with the preferred embodiment of my invention prior to being napped.

Fig. 3 is a plan view of a designer's draft sheet showing the order of design for cutting the cards for making my improved embodiment of fabric.

Fig. 4 is a plan view of a designer's sheet illustrating the order of weaving on a 2—2 shuttle box Jacquard loom.

Fig. 5 is a plan view of a designer's sheet illustrating the order of design generally similar to Fig. 3 in which the respective cotton and woolen threads are shown respectively in red and blue prior to beating up.

Fig. 6 is a diagrammatic plan view illustrating a designer's cut card for each pair of threads and modified to indicate the points of run reversal which actually takes place in the fabric and thus being an enlarged view of one pattern section of the fabric, the respective cotton and woolen threads being shown in red and blue respectively.

Fig. 7 represents a plurality of cross sectional views taken respectively beside each pair of threads of the complete jacquard design.

Fig. 8 represents a plurality of longitudinal sectional views taken along the first five warp threads shown in Fig. 6, and illustrating how the points of tie-in in the different warps vary to produce the twill in the preferred embodiment, the respective cotton and woolen filling threads being shown in red and blue.

Fig. 9 is a fragmentary side elevation of a preferred type of cotton filling thread wound on a core I preferably employ.

Fig. 10 is a sectional view thereof.

Fig. 11 is a fragmentary side elevation of one of the woolen filling threads I preferably employ.

Fig. 12 is a diagrammatic view of a double action breaker napper I preferably employ.

Fig. 13 is a fragmentary end view showing the sharp points I preferably employ in the napper clothing of the breaker napper employed in Fig. 12.

Fig. 14 is a diagrammatic sectional view of the fabric after the fibres have been cut and raised on each side thereof in the breaker napper.

Fig. 15 is a diagrammatic view of a portion of a finisher or tucking in double action napper preferably employed to tuck in the ends of the severed or pulled out fibres hitherto shown.

Fig. 16 is a fragmentary view showing the preferably blunt ends of the napper clothing employed in this type of finisher napper.

Fig. 17 is a diagrammatic sectional view similar to Fig. 14 after the ends of the fibres have been tucked in by the finisher napper.

Fig. 18 is a diagrammatic cross sectional view taken through the unnapped fabric of the preferred embodiment of my invention shown in Fig. 1 for a plurality of runs each of a plurality of floats of face and reverse twill of a pair of threads only across the unnapped fabric.

Fig. 19 is a diagrammatic cross sectional view of the individual threads of the fabric shown in Fig. 18 after the fabric has been napped in the breaker napper.

Fig. 20 is a diagrammatic sectional view of the pair of threads shown in Figs. 18 and 19 illustrating how the relatively long and short fibers are tucked in by the finisher napper to provide both the outer and inner coverings extending substantially over the entire face and reverse of the fabric.

Fig. 21 is a diagrammatic longitudinal sectional view of an unnapped fabric illustrating how the warp threads respectively tie-in the filling threads and are substantially concealed thereby.

Figure 1:
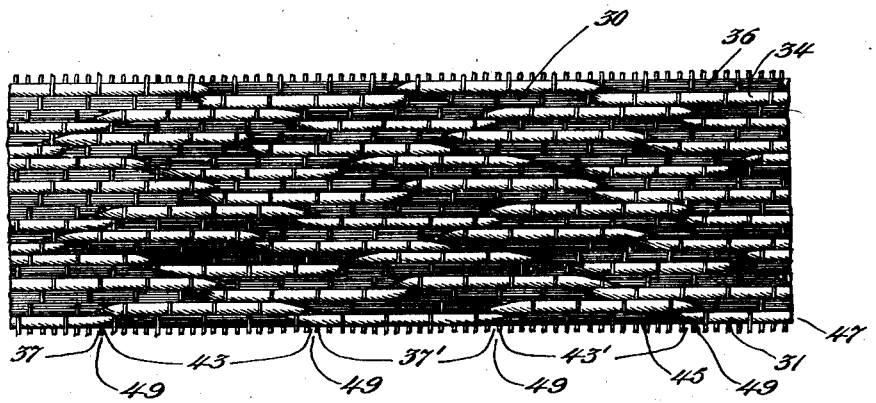

In the drawings, wherein like characters of reference indicate like parts throughout, 30 (Fig. 1) generally indicates a fabric constructed in accordance with the improved specific embodiment of my invention prior to being napped and 32 (Fig. 2) indicates the same fabric after it has been napped.

I have shown the preferred embodiment of my invention woven with complemental pairs of filling threads to provide a compact fabric having a substantially equally heavy face and reverse, and constructed of alternate filling threads 34 composed of cotton or other relatively short fibres and alternate filling threads 36 composed of wool or other relatively long fibres.

In the preferred embodiment shown, however, each pair 47 is made up of a cotton thread 34 and a woolen thread 36, although it is obvious that each pair may be made up of two cotton threads or two woolen threads or that even if not woven in complemental pairs, the picks may be woven double or multiple, that is, first two or more cotton picks, then two or more woolen picks. In the embodiment shown, the filling threads 34 are loosely woven and preferably constructed of cotton *Gossypium arboreum*, namely, Asiatic cotton with the characteristics heretofore described. In order to provide a tensile strength to the cotton threads I preferably provide them with a core 38, which may comprise the closely twisted relatively small core 38 twisted around and with the loosely spun cotton or other short fibre thread 35 to provide substantially a core in use for purposes of strength and to yet leave free the great body of the cotton fibres in positions so that they may be readily napped. The woolen threads 36 are preferably constructed of loosely spun wool of relatively long fibres. It is apparent, however, that insofar as certain structural features of my improved fabric are concerned and my improved method of napping it, that the threads containing the relatively long and short fibres may be individually separated as shown or that the long and short fibres may consist of any suitable material and may be simultaneously twisted into the same threads in order that long and short fibres may be present in the compact body of the fabric so as to provide on later napping the long fibres for the outer covering and the short fibres for the inner covering.

In the embodiment of my invention shown, each throw of cotton filling is preferably followed by a complemental throw of a woolen filling to make the pairs as shown in the designer's draft sheet shown in Figs. 3 and 5, although as stated it may if desired be followed by a complemental throw of a cotton filling.

In order that the preferred embodiment of my invention may be better understood I will first describe through the medium of the designer's draft sheets shown in Figs. 3–7 the method of weaving the fabric of the preferred embodiment of my invention which is particularly adapted for providing a blanket or other napped fabric of sufficient body for napping and with the alternate cotton and wool threads substantially evenly distributed over the face and reverse thereof to form the desired inner and outer coverings on napping also providing if the threads are dyed before or after weaving a rather pretty mottled pattern. Fig. 3 as stated represents a designer's draft sheet for the single threads, Fig. 4 represents a designer's sheet showing the order of weaving of the different single threads in a 2—2 shuttle box Jacquard loom. Fig. 5 is similar to Fig. 3 showing the complete jacquard pattern shown in Fig. 3 with the cotton and wool threads respectively filled in red and blue respectively before they are beaten up to form the fabric diagrammatically illustrated by the designer's draft sheet as shown in Fig. 6 in accordance with the preferred embodiment of my invention.

Figure 2:
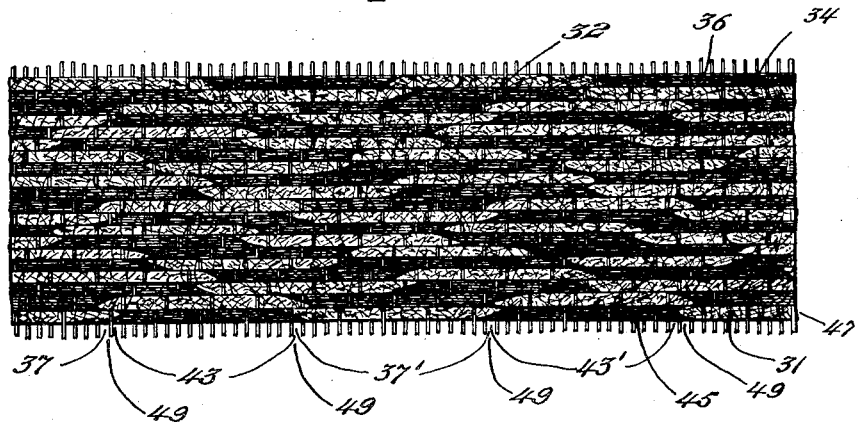
Fig. 2 is a plan view of the face of a finished fabric constructed as shown in Fig. 1 and napped in accordance with my invention.

As shown more particularly in Fig. 7, and Figs. 18–20 the fabric is woven in accordance with said designer's draft sheets as follows:

I throw a thread 31 of a pair of filling threads 47 (as shown thread No. 2) over and under the warp threads 40, in this instance being a cotton thread 34 (Fig. 18), over a plurality of warp threads 40 to provide a float 33 and I tie it in under a less number as shown diagrammatically under one warp thread 40 as at 42 for a run 37 of a plurality of floats 33 during a portion of its travel, then floating as at 33 under a substantially equal plurality of warp threads 40 and tying in over a lesser number namely over one warp thread 40 as at 42 for a substantial equal plurality of floats 33 for the next run 39 of its travel and so successively running alternately as at 37', 39' etc., over and under the warp threads for runs of substantially equal pluralities of floats 33 and respectively tying in under and over as at 42 a lesser number of warp threads for the balance of its travel, complementally reversely throwing the other filling thread 45 of said pair 47 (preferably a wool thread 36) for a first under run 41, a second over run 43 and so on as at 41', 43', etc., for the balance of its travel, beating up the pair of threads so that the float portions 33 of each thread will substantially overlap and conceal points of tie-in 42 of said other thread of said pair on the respective face 46 and reverse 48 of the fabric 30. It is thus obvious that the filling thread 31 and second filling thread 45 will form the pair of threads 47 as shown in the draft sheets (Figs. 3–8) as threads 2 and 1. I then successively throw and beat up similar pairs 47 of threads up to a jacquard pattern as shown in Figs. 3 to 8 of 16 threads or 8 pairs of filling threads with the respective points of over and under run reversal 49 and points of tie-in 42 varying in successive pairs (see Figs. 3 to 8) up to the end of said pattern to provide a compact substantially equally heavy face and reverse on said fabric each presenting substantially equal amounts of the respective floats 33 or runs of floats 37, 39, and 41, 43 etc., of each thread of each pair thereon. In Figs. 4, 5, 6, 8, and 21 the cotton threads are shown symbolically in red or vertical lines and the woolen threads symbolically in blue or horizontal lines and in Figs. 1, 2, 7, 18 to 20 the cotton and woolen threads are shown respectively as light and dark. Thus as shown in Figs. 1, 6, and 18 the cotton thread 31 of the pair 47 will appear for the float intervals 37, 37' etc., on the face of the fabric and the woolen thread 45 will appear at the complemental interval 43, 43' etc., on the face of the fabric and vice versa as at 39, 39', 41, 41' etc., on the reverse of the fabric. In order to provide a more irregular fabric and to stagger the points of over and under run reversal 49, I preferably provide a jacquard or other pattern consisting of any number of threads or pairs of threads to vary this feature to make a more compact fabric. Thus as will be seen in Figs. 1 to 8 and 18 to 21 more particularly in Fig. 7 (which shows cross sectional views of the fabric showing the runs of each successive pair of filling threads in the pattern) it will be observed that these points of over and under run of reversal 49 and preferably also the points of tie-in 42 are varied. Thus the pairs 47 namely the respective pairs, 3, 4; 5, 6; 7, 8; 9, 10; 11, 12; 13, 14; 15, 16; are woven as shown with said points of over and under run reversal 49 and tie-in 42 thereof varied up to the end of the jacquard pattern.

Fig. 3 illustrates a designer's draft sheet. I have found in practice that in weaving on a 2—2 shuttle box Jacquard loom that the order of weaving will best be varied therefrom as shown in Fig. 4.

Fig. 5 is a diagrammatic view showing how the threads are preferably woven in pairs 47 preferably consisting of one cotton filling thread 31 and one woolen filling thread 45 each being the complement of the other. After weaving these are beaten up into the compact fabric shown in Figs. 1, 2, and 6 in which the runs of the respective threads appearing on the face of the fabric alternate transversely of the fabric and the points of over and under run reversal are staggered longitudinally and transversely of the fabric. This staggering is preferably achieved so that the adjacent filling threads may tend to overlap and conceal the points 49 of over and under run reversal.

While any type of a weave such as hitherto described may be employed, I preferably employ a true twill weave by making a float portion 33 extend say for three over and a tie-in for one under to provide a face twill during the first run 37 thereof and then one over and three under to provide a reverse twill for the second run 39 thereof and so on for the runs 37', 39', etc., across the fabric, as I have found in practice that the combination of alternate face and reverse 3/1 twill provides the most compact and desirable type of fabric for this purpose, although as stated in order to come within the spirit of my invention it is merely essential that the float portion be of greater transverse length than the tie-in portion as would be possible with almost any kind of a twill sateen, broken weave etc. It is thus obvious that as shown in Fig. 1, I have provided a fabric that is suitable for napping comprising relatively light warps 40 and pairs 47 of filling threads 31 and 45, each thread of each pair namely threads 31 and 45 being complementally alternately floated as at 33 over a plurality of warp threads and tied in under a lesser number as at 42 for a run 37 of a plurality of floats during a portion of its travel, then floated under a plurality of warp threads as at 39 and tied in over a less number as at 42 for a run 39 of a substantially equal number of floats and successively similarly running alternately for runs 37', 39' of a substantially equal plurality of floats over and under said warp threads across said fabric, beaten up so that the float portions 33 of each thread will substantially overlap and conceal points of tie-in 42 of said other of said pair of threads, adjacent pairs 47 of filling threads having their runs irregularly staggered as at 49 to provide a compact substantially equally heavy face 46 and reverse 48 on said fabric, each presenting substantially equal amounts of the respective runs 37, 39 and 41—43 of floats 33 respectively of each respective thread 31 and 45 of each pair 47 thereon and in my preferred form with the filling threads each comprising alternate complemental substantially equal runs of face and reverse twill across said warp threads and fabric. It is obvious, however, that if desired at intervals throughout the pattern the number of adjacent threads of the same species may be varied either in or out of the pairs. As shown in Fig. 1 the warp threads are preferably woven somewhat loosely so that they may assume somewhat of the exaggerated position shown in Fig. 21 going up and down in between the filling threads so as to be substantially buried thereby to secure an even nap. As stated hitherto if desired the fabric may or may not be woven in pairs of filling threads, but with alternate single filling threads woven as shown in Fig. 5 and not beaten up over the other respective threads as shown in Fig. 6. The specific weave heretofore described has been called since its recent introduction a tumble-in or tumble weave comprising preferably a mixed face and reverse twill having irregularly staggered points of tie-in and over and under run reversal in the manner hitherto described and specifically shown. This tumble in weave produces a fabric of adequate compactness so that the proper napping can be done and yet not so compact to form a boardy fabric which would have no "drapiness" necessary for the "body fit" of a blanket. It also provides equally on each side an irregular surface so necessary for a well covered napped finished surface and where alternate cotton and wool or other short and long fibre threads are employed having the wool and cotton threads evenly distributed for napping to provide a substantially continuous inner covering or pelage and an outer covering over the face and reverse of the fabric.

After a type of fabric suitable for napping has been woven namely, one which has a relatively large number of float threads and in which the warp threads 40 are substantially buried therein and the points of run reversal 49 of the float threads are irregularly staggered throughout the fabric to provide a compact fabric suitable for napping or however compact a fabric may be provided, preferably one with alternate cotton and wool or other respective relatively long and short fibre filling threads or even with threads containing a mixture of short or long fibres, it is then according to my improved method preferably subjected to the following napping operations:

The long and short fibres from the respective filling threads are first cut and/or raised in any suitable manner, preferably as shown in Fig. 12 by a succession of rotating sharp pointed members for a substantial distance through said threads as shown in Fig. 14, the long fibres being cut and raised as shown at 50 in Figs. 14 and 19 and the short fibres being cut and raised as shown at 52 in Figs. 14 and 19. While this may be done in any suitable type of a gig, single action napper or other napper, I have obtained best results by passing both the face 46 and successively the reverse 48 of the fabric 30 the desired number of times over the sets of oppositely rotating rolls 54 and 56 of a double action napper 53. In a double action napper the main cylinder 58 is slowly rotated as the cloth is led thereover by the guide rolls 60, each alternate set of napping rolls 54 and 56 being alternately driven in opposite directions by suitable means not shown. The rolls 54 and 56 are constructed of napping clothing 62 which preferably has set therein the teeth 64 obliquely bent in one direction as at 66 and preferably sharp pointed as at 68. As shown the direction of the teeth 64 are reversed in the sets of rolls 54 and 56 so as to cut and raise the nap in opposite directions. This is what is called a double action napper whereas in a single action napper the rolls 54 and 56 are all rotated in the same direction. While in the breaker napping a single action napper may be employed, I have obtained better results in raising the relatively long and short fibres 50 and 52 by employing even in the breaking napping a double action napper. As shown in Fig. 12 the action of the teeth 64 is to cut away the threads for a substantial distance inwards as shown at 70 in Fig. 19 and thus to provide both the face 46 and reverse 48 of the fabric with the upstanding cut and/or raised long and short respective fibres 50 and 52.

In some instances this napping is all that is necessary, but in my preferred embodiment in order to provide a more heat insulating and compact inner covering 72 and outer covering 74 I preferably tuck in the ends of said cut or raised fibres into the respective filling threads 34 and 36 by subjecting the face and reverse of the fabric to the action of adjacently disposed oppositely rotating rolls, each containing oppositely disposed blunt pointed members, namely, in the double action finisher napper shown in Fig. 15. This is a duplicate of the double action breaker napper shown in Fig. 12 with the exception that the napper teeth 64 instead of being provided with the sharp points 68 are provided with the blunt points 69. The reverse rotation of the sets of rolls 54 and 56 and the blunt ends 69 serve in this instance to tuck in the ends 76 and 78 respectively of the respective cut and/or raised long and short fibres 50 and 52 shown in Figs. 14 and 19, into the respective threads 34 and 36 to provide the tucked-in loops 80 and 82 of long and short respective fibres as shown in Figs. 18–20 somewhat analogous to terry thread loops, although instead of being woven in threads, they are tucked in fibres, to provide the fabric with the tucked-in outer long fibre covering 72 and the tucked-in inner short fibre covering 74 or pelage. It is obvious that where as in my preferred embodiment alternate long and short fibre filling threads be employed that the outer covering 72 will be formed from the long fibre filling threads 36 and the short covering 74 or pelage will be formed from the alternate short fibre filling threads 34. It is obvious, however, that if the long and short fibres be mixed in the individual threads that a tucked-in outer covering 72 will be provided as well as a tucked-in inner covering 74, but that the individual coverings will not be so distinct or compact as where they are individually made from alternate long fibre and short fibre filling threads as shown in my preferred embodiment. A great deal of warmth is provided where the cotton *Gossypium arboreum* or so-called Asiatic cotton is employed to provide the short fibres.

It is thus apparent that by weaving a suitable compact fabric having a face and reverse composed substantially of exposed float threads compactly arranged within a repeat of a pattern and with the warp threads substantially buried that a very warm fabric will be provided with the outer covering 72 and the inner covering 74 or pelage. Due to the peculiar properties of cotton *Gossypium arboreum*, it is obvious that when constructed thereof the inner covering 74 due to its serrations and short fibres will provide heat insulating properties generally similar to that of wool but compactly covering the fabric with an inner coating. It is thus apparent that any type of fabric however woven constructed of filling threads of long and short fibres and subjected to my improved napping process will provide a fabric having an outer covering consisting of tucked in long fibres and tucked in short fibres in accordance with the broad features of my invention.

It is understood that my invention is not limited to the specific embodiments shown and methods described and that various deviations may be made therefrom without departing from the spirit and scope of the appended claims.

What I claim is:

1. A napped fabric comprising relatively light warp threads and filling threads floated and tied into the warp on each side thereof, adjacent filling threads being floated and tied into the warp threads in irregularly staggered fashion so that said tie-ins will be substantially concealed by the softer adjacent floats to provide a compact substantially equally heavy face and reverse on the fabric, said filling threads containing loosely spun relatively long fibres and loosely spun relatively short fibres, the fibres on said filling float threads on the face of said fabric being raised for a substantial distance through said threads and having the ends thereof tucked into said threads or adjacent threads to form an outer covering of napped tucked in long fibres extending substantially entirely over said napped fabric, and an inner covering or pelage of napped tucked in short fibres extending substantially entirely over said napped fabric.

2. A napped fabric comprising relatively light warp threads and filling threads complementally floated and tied into the light warp on each side thereof, adjacent filling threads being floated and tied into the warp threads in irregularly staggered fashion so that said tie-ins will be substantially concealed by the softer adjacent floats to provide a compact substantially equally heavy face and reverse on the fabric, said filling threads containing loosely spun relatively long fibres and loosely spun relatively short fibres, the fibres on said filling float threads on the face and reverse of said fabric being raised for a substantial distance through said threads and having the ends thereof tucked into said threads or adjacent threads to form an outer covering of napped tucked in long fibres extending substantially entirely over and under said napped fabric, and an inner covering or pelage of napped tucked in short fibres extending substantially entirely over and under said napped fabric.

3. A napped fabric comprising relatively light warp threads and filling threads floated and tied into the warp on each side thereof, adjacent filling threads being floated and tied into the warp threads in irregularly staggered fashion so that said tie-ins will be substantially concealed by the softer adjacent floats to provide a compact fabric, said filling threads containing loosely spun wool and loosely spun *Gossypium arboreum* species of cotton, the fibres on said filling float threads on the face of said fabric being raised for a substantial distance through said threads and having the ends thereof tucked into said threads or adjacent threads to form an outer covering of napped tucked in long fibres extending substantially entirely over said napped fabric, and an inner covering or pelage of napped tucked in short fibres extending substantially entirely over said napped fabric.

4. A napped fabric comprising relatively light warp threads and filling threads floated and tied into the warp on each side thereof, adjacent filling threads being floated and tied into the warp threads in irregularly staggered fashion so that said tie-ins will be substantially concealed by the softer adjacent floats to provide a compact fabric, certain of said filling threads containing loosely spun wool or other relatively long fibres and alternate filling threads containing a closely twisted core and a loosely spun substantial covering of *Gossypium arboreum* species of cotton or other relatively short fibres, the fibres on said respective filling float threads on the face of said fabric being raised for a substantial distance through said threads and having the ends thereof tucked into said threads or adjacent threads to form an outer covering of napped tucked in long fibres from said long fibre threads extending substantially entirely over said napped fabric, and an inner covering or pelage of napped tucked in short fibres from said adjacent short fibre threads extending substantially entirely over said napped fabric.

5. A fabric comprising relatively light warp threads and filling threads, each thread being floated over a plurality of warp threads and tied in under a less number for a run of a plurality of floats during a portion of its travel, then floated under a plurality of warp threads and tied in over a less number for a run of a substantially equal number of floats, and successively similarly run alternately for runs of a substantially equal plurality of floats over and under said warp threads across said fabric, said filling threads containing loosely spun relatively long fibres and loosely spun relatively short fibres, the fibres on said filling float threads on the face being raised for a substantial distance through said threads and having the ends thereof tucked into said threads or adjacent threads to form an outer covering of napped tucked in long fibres extending substantially entirely over said napped fabric, and an inner covering or pelage of napped tucked in short fibres extending substantially entirely over said napped fabric.

6. A napped fabric comprising relatively light warp threads and filling threads, each filling thread comprising alternate substantially equal runs of face and reverse twill across said warp threads, said filling threads containing loosely spun relatively long fibres and loosely spun relatively short fibres, the fibres on said filling float threads on the face being raised for a substantial distance through said threads and having the ends thereof tucked into said threads or adjacent threads to form an outer covering of napped tucked in long fibres extending substantially entirely over said napped fabric and an inner covering or pelage of napped tucked in short fibres extending substantially entirely over said napped fabric.

7. The method of manufacturing a compact napped fabric having a relatively long outer covering and a relatively short inner covering or pelage which comprises weaving a fabric by successively throwing filling threads over and under the warp threads, each thread alternately floating over a plurality of warp threads and tying in under a less number for a run of a plurality of floats during a portion of its travel, then floating under a substantially equal plurality of warp threads and tying in over a lesser number for a substantially equal plurality of floats for the next run of its travel and so successively running alternately over and under the warp threads for substantially equal pluralities of floats and respectively tying in under and over lesser numbers of warp threads for the balance of its travel, said filling threads or adjacent threads containing loosely spun relatively long fibres and loosely spun relatively short fibres, raising both the long and short fibres from the respective threads for a substantial distance through said threads and tucking in the ends of said cut or raised fibres into the respective threads to form an outer covering of napped tucked in long fibres extending substantially entirely over said napped fabric and an inner covering of napped tucked in short fibres extending substantially entirely over said napped fabric.

8. The method of manufacturing a compact napped fabric having a relatively long outer covering and a relatively short inner covering or pelage which comprises weaving a fabric by successively throwing filling threads over and under the warp threads, each thread alternately floating over a plurality of warp threads and tying in under a less number for a run of a plurality of floats during a portion of its travel, then floating under a substantially equal plurality of warp threads and tying in over a lesser number for a substantially equal plurality of floats for the next run of its travel and so successively running alternately over and under the warp threads for substantially equal pluralities of floats and respectively tying in under and over lesser numbers of warp threads for the balance of its travel with the respective points of over and under run reversal varying in successive threads, said filling threads containing loosely spun relatively long fibres and loosely spun relatively short fibres, raising both the long and short fibres from the respective threads for a substantial distance through said threads and tucking in the ends of said cut or raised fibres into the respective threads to form an outer covering of napped tucked in long fibres extending substantially entirely over said napped fabric and an inner covering of napped tucked in short fibres extending substantially entirely over said napped fabric.

9. The method of manufacturing a compact napped fabric having a relatively long outer covering and a relatively short inner covering or pelage on the face and reverse thereof which comprises weaving a fabric by throwing the first of a pair of filling threads over and under the warp threads, said thread alternately floating over a plurality of warp threads and tying in under a less number for a run of a plurality of floats during a portion of its travel, then floating under a substantially equal plurality of warp threads and tying in over a lesser number for a substantially equal plurality of floats for the next run of its travel and so successively running alternately over and under the warp threads for substantially equal pluralities of floats and respectively tying in under and over lesser numbers of warp threads for the balance of its travel, complementally reversely throwing the other filling thread of said pair and beating up the threads so that the float portions of each thread will substantially overlap and conceal points of tie in of said other pair thread on the respective face and reverse of the fabric, successively throwing and beating up similar pairs of threads with the respective points of over and under run reversal varying in successive pairs to provide a compact substantially even face and reverse on said fabric, each presenting substantially equal amounts of the respective floats of each thread of each pair thereon, said filling threads containing loosely spun relatively long fibres and loosely spun relatively short fibres, raising both the long and short fibres from the respective threads for a substantial distance through said threads and tucking in the ends of said cut or raised fibres into the respective threads to form an outer covering of napped tucked in long fibres extending substantially entirely over and under said napped fabric and an inner covering of napped tucked in short fibres extending substantially entirely over and under said napped fabric.

10. The method of manufacturing a compact napped fabric having a relatively long outer covering and a relatively short inner covering or pelage which comprises weaving a fabric by successively throwing filling threads over and under the warp threads, each thread alternately floating over a plurality of warp threads and tying in under a less number for a run of a plurality of floats during a portion of its travel, then floating under a substantially equal plurality of warp threads and tying in over a lesser number for a substantially equal plurality of floats for the next run of its travel and so successively running alternately over and under the warp threads for substantially equal pluralities of floats and respectively tying in under and over lesser numbers of warp threads for the balance of its travel, said filling threads containing loosely spun relatively long fibres and loosely spun relatively short fibres, raising both the long and short fibres from the respective threads by a succession of rotating sharp pointed members for a substantial distance through said threads and tucking in the ends of said cut or raised fibres into the respective threads by subjecting them to the action of adjacently disposed oppositely rotating rolls each containing oppositely disposed blunt pointed members to form an outer covering of napped tucked in long fibres extending substantially entirely over said napped fabric and an inner covering of napped tucked in short fibres extending substantially entirely over said napped fabric.

11. The method of manufacturing a compact napped fabric having a relatively long outer covering and a relatively short inner covering or pelage which comprises weaving a fabric of warp threads by floating and tying in filling threads in irregularly staggered fashion to provide a compact fabric, said filling threads containing loosely spun relatively long fibres and loosely spun relatively short fibres, raising both the long and short fibres from the respective threads for a substantial distance through said threads and tucking in the ends of said cut or raised fibres into the respective threads to form an outer covering of napped tucked in long fibres extending substantially entirely over said napped fabric and an inner covering of napped tucked in short fibres extending substantially entirely over said napped fabric.

12. The method of manufacturing a compact napped fabric having a relatively long outer covering and a relatively short inner covering or pelage which comprises weaving a fabric of warp threads by floating and tying in filling threads in irregularly staggered fashion to provide a compact fabric, said filling threads containing loosely spun relatively long fibres and loosely spun relatively short fibres, raising both the long and short fibres from the respective threads by a succession of rotating sharp pointed members for a substantial distance through said threads and tucking in the ends of said cut or raised fibres into the respective threads by subjecting them to the action of adjacently disposed oppositely rotating rolls each containing oppositely disposed blunt pointed members to form an outer covering of napped tucked in long fibres extending substantially entirely over said napped fabric and an inner covering of napped tucked in short fibres extending substantially entirely over said napped fabric.

BOUGHTON COBB.